(12) United States Patent
Hedrick et al.

(10) Patent No.: US 7,247,233 B1
(45) Date of Patent: Jul. 24, 2007

(54) APPARATUS AND PROCESS FOR MINIMIZING CATALYST RESIDENCE TIME IN A REACTOR VESSEL

(75) Inventors: Brian W. Hedrick, Rolling Meadows, IL (US); Paolo Palmas, Des Plaines, IL (US); Daniel N. Myers, Arlington Heights, IL (US); Michael C. Newman, Oak Park, IL (US); Agnieszka Ziolkiewicz-Dydak, Groves, TX (US); Andrew W. Broerman, Vincennes, IN (US)

(73) Assignee: UOP LLC, Des Plaines, IL (US)

( * ) Notice: Subject to any disclaimer, the term of this patent is extended or adjusted under 35 U.S.C. 154(b) by 592 days.

(21) Appl. No.: 10/461,139

(22) Filed: Jun. 13, 2003

(51) Int. Cl.
*B32B 5/02* (2006.01)
*C10G 11/00* (2006.01)

(52) U.S. Cl. .................. 208/113; 422/139; 422/145; 422/147

(58) Field of Classification Search ............... 422/139, 422/141, 142, 144, 145, 147; 208/106, 107, 208/108, 113
See application file for complete search history.

(56) References Cited

U.S. PATENT DOCUMENTS

| 4,220,623 A | 9/1980 | Jahnke et al. ............... 422/144 |
| 4,397,738 A | 8/1983 | Kemp ....................... 208/161 |
| 4,482,451 A | 11/1984 | Kemp ....................... 208/161 |
| 4,792,437 A | 12/1988 | Hettinger, Jr. et al. ...... 422/147 |
| 4,946,656 A * | 8/1990 | Ross et al. .................. 422/144 |
| 5,584,985 A | 12/1996 | Lomas ....................... 208/113 |
| 2004/0104149 A1* | 6/2004 | Lomas et al. ............... 208/146 |

* cited by examiner

*Primary Examiner*—N. Bhat
(74) *Attorney, Agent, or Firm*—James C Paschall

(57) ABSTRACT

A reactor conduit discharges into a disengaging chamber that is directly connected to a separator. A dipleg of the separator is directly connected to the disengaging chamber or to an intermediate chamber which is in direct communication with the disengaging chamber.

18 Claims, 3 Drawing Sheets

APPARATUS AND PROCESS FOR MINIMIZING CATALYST RESIDENCE TIME IN A REACTOR VESSEL

BACKGROUND OF THE INVENTION

This invention relates generally to processes for the quick separation of particulate solids from gases. More specifically, this invention relates to minimizing the contact between gaseous products and catalyst particles after reaction.

DESCRIPTION OF THE PRIOR ART

A fluidized catalytic cracking (FCC) process is a process that cracks higher molecular weight hydrocarbons down to gasoline and liquefied petroleum gas (LPG) range hydrocarbons. The FCC process is carried out by contacting hydrocarbonaceous feed material such as vacuum gas oil, residual crude, or another source of relatively high boiling hydrocarbons with a catalyst made up of finely divided or particulate solid material in an elongated conduit. Contact of the feed with the fluidized catalyst particles catalyzes the cracking reaction while coke is deposited on the catalyst. Catalyst exiting the reaction zone is spoken of as being "spent", i.e., partially deactivated by the deposition of coke upon the catalyst. Spent catalyst is traditionally transferred to a stripper that removes adsorbed hydrocarbons and gases from catalyst and then to a regenerator for purposes of removing the coke by oxidation with an oxygen-containing gas. Regenerated catalyst is returned to the reaction zone. Oxidizing the coke from the catalyst surface releases a large amount of heat, a portion of which leaves the regenerator with the regenerated catalyst. The FCC processes, as well as separation devices used therein are fully described in U.S. Pat. No. 5,584,985 and U.S. Pat. No. 4,792,437.

Spent catalyst still has catalytic activity. Prolonged contact between spent catalyst and cracked product can allow overcracking of desired products and additional coke deposition, thereby diminishing the recovery of desired product. Spent catalyst and gas products exiting the reactor conduit typically enter into a voluminous reactor vessel in which they may reside for prolonged times before separation, thereby allowing additional cracking to occur. Separation devices at the discharge end of the reactor conduit have been used to quickly separate much of the catalyst and gaseous product.

U.S. Pat. No. 4,397,738 and U.S. Pat. No. 4,482,451 disclose an arrangement for making a quick separation by tangentially discharging a mixture of gaseous product and solid catalyst particles from a reactor conduit into a containment vessel. The centrifugal force created by the tangential discharge of the gases containing solid catalyst particles forces the heavier solids particles outwardly away from the lighter gases thereby allowing upward withdrawal of gases and downward collection of solids. The containment vessel has a relatively large diameter and generally provides a first separation of solids from gases. In these arrangements the initial stage of separation is typically followed by a second more complete separation of solids from gases in a traditional cyclone separator located in the reactor vessel.

Cyclone separators usually comprise relatively small diameter cyclones having a tangential inlet on the outside of a cylindrical vessel that forms the outer housing of the cyclone. The tangential inlet imparts a tangential velocity to entering gases and entrained solids forcing outward and downward collection of solids and upward withdrawal of the lighter gases. The collected catalytic solids usually descend through a dipleg into a catalyst bed at bottom of the reactor vessel.

The catalyst bed is typically fluidized to facilitate entry of the catalyst into a stripper vessel. The reactor vessel contains a large volume of empty space in which catalyst can become entrained with gaseous product. Entrainment can occur when catalyst is being transferred between separator stages, transferred from the cyclone dipleg into the catalyst bed and fluidized in the catalyst bed. Typically, the reactor vessel is purged with an inert gas, such as steam, to suppress product gases from floating with entrained catalyst particles in the reactor vessel. However, catalyst particles entrained in the inert gas have hydrocarbons adsorbed thereon, which may continue to react until the catalyst enters the stripping vessel. Finally, in the stripping vessel a substantial proportion of the hydrocarbons are desorbed and separated from the catalyst particles. Consequently, catalyst and gaseous product can be together in the reaction vessel for a long period of time after the desired reaction is complete and the catalyst and gaseous product exit the reactor conduit.

U.S. Pat. No. 4,220,623 discloses a reactor vessel for an FCC unit that is divided from a stripper vessel. Stripper vent lines extend from the stripper vessel upwardly along the diplegs of cyclones in the reactor vessel to a height above the dense bed in the reactor vessel. The arrangement purports to reduce the height of the reactor vessel. The reactor conduit is not directly connected to the cyclone separators in the reactor vessel.

U.S. Pat. No. 4,946,656 discloses a reactor conduit directly connected to a first stage cyclone separator, which is connected to a second stage cyclone separator by a gas conduit. The recovery conduit between the first and second stage cyclone separators is open to the reactor vessel. The diplegs of the first and second stage cyclone separators descend into a stripper zone through a frustoconical stripper cap. A circumference of the stripper cap is spaced from the inner sidewall of the reactor vessel by a maximum distance of 25% of the inside radius of the reactor vessel. A vent conduit delivers gases from the stripper zone to the conduit between the first and second stage cyclone separators. The steam flow rate necessary to prevent product gases from passing from the stripper zone into the reactor vessel though the numerous openings in the stripper cap and to drive product gases upwardly through the vent conduit to the recovery conduit will be very large.

BRIEF SUMMARY OF THE INVENTION

We have discovered a way to minimize the time that catalyst and gaseous products are in contact after exiting the discharge end of a reactor conduit of an FCC unit. The reactor conduit discharges into a disengaging chamber which is directly connected to a separator. A dipleg of the separator is directly connected to the disengaging chamber or to an intermediate chamber which is in direct communication with the disengaging chamber. Accordingly, catalyst never becomes entrained in the large open volume of the reactor vessel. Consequently, catalyst which makes it out of the disengaging chamber is quickly returned back to the disengaging chamber, thereby minimizing the time that catalyst and gas products are in contact after being discharged from the reactor conduit. Moreover, the reactor vessel may be purged with an inert gas such as steam to prevent any product gases from ascending upwardly in the reactor vessel.

Accordingly, it is an object of the present invention to provide an apparatus and process for minimizing the time that solid catalyst particles and gas products are in contact with each other after being discharged from a reactor conduit of an FCC unit.

Additional details and embodiments of the invention will become apparent from the following detailed description of the invention.

DESCRIPTION OF THE INVENTION

The present invention can be used in any apparatus or process in which solids and gases must be separated. However, an FCC process always requires such separations and will be the most widespread application for the present invention. Hence, the present invention will be exemplarily described in an FCC application.

Looking first at more details of an FCC process in which the present invention may be used, the typical feed to an FCC unit is a gas oil such as a light or vacuum gas oil. Other petroleum-derived feed streams to an FCC unit may comprise a diesel boiling range mixture of hydrocarbons or heavier hydrocarbons such as reduced crude oils. In an embodiment, the feed stream may consist of a mixture of hydrocarbons having initial boiling points, as determined by the appropriate ASTM test method, above about 230° C. (446° F.), often above about 290° C. (554° F.) and typically above about 315° C. (600° F.) and end points no more than about 566° C. (1050° F.). The reaction zone of an FCC process is maintained at high temperature conditions which may generally include a temperature above about 425° C. (797° F.). In an embodiment, the reaction zone is maintained at cracking conditions which include a temperature of from about 480° to about 590° C. (896° to 1094° F.) and a pressure of from about 69 to about 517 kPa (ga) (10 to 75 psig) but typically less than about 275 kPa (ga) (40 psig). The catalyst-to-oil ratio, based on the weight of catalyst and feed hydrocarbons entering the bottom of the riser, may range up to 20:1 but is typically between about 4:1 and about 10:1. Hydrogen is not normally added to the riser, although hydrogen addition is known in the art. On occasion, steam may be passed into the riser to effect catalyst fluidization and feed dispersion. The average residence time of catalyst in the riser may be less than about 5 seconds. The type of catalyst employed in the process may be chosen from a variety of commercially available catalysts. A catalyst comprising a zeolite base material is preferred, but the older style amorphous catalyst may be used if desired.

The catalyst regeneration zone is preferably operated at a pressure of from about 69 to about 552 kPa (ga) (10 to 80 psig). The spent catalyst being charged to the regeneration zone may contain from about 0.2 to about 15 wt-% coke. This coke is predominantly comprised of carbon and can contain from about 3 to about 12 wt-% hydrogen, as well as sulfur and other elements. The oxidation of coke will produce the common combustion products: water, carbon oxides, sulfur oxides and nitrous oxides. As known to those skilled in the art, the regeneration zone may take several configurations, with regeneration being performed in one or more stages.

Figure 1:
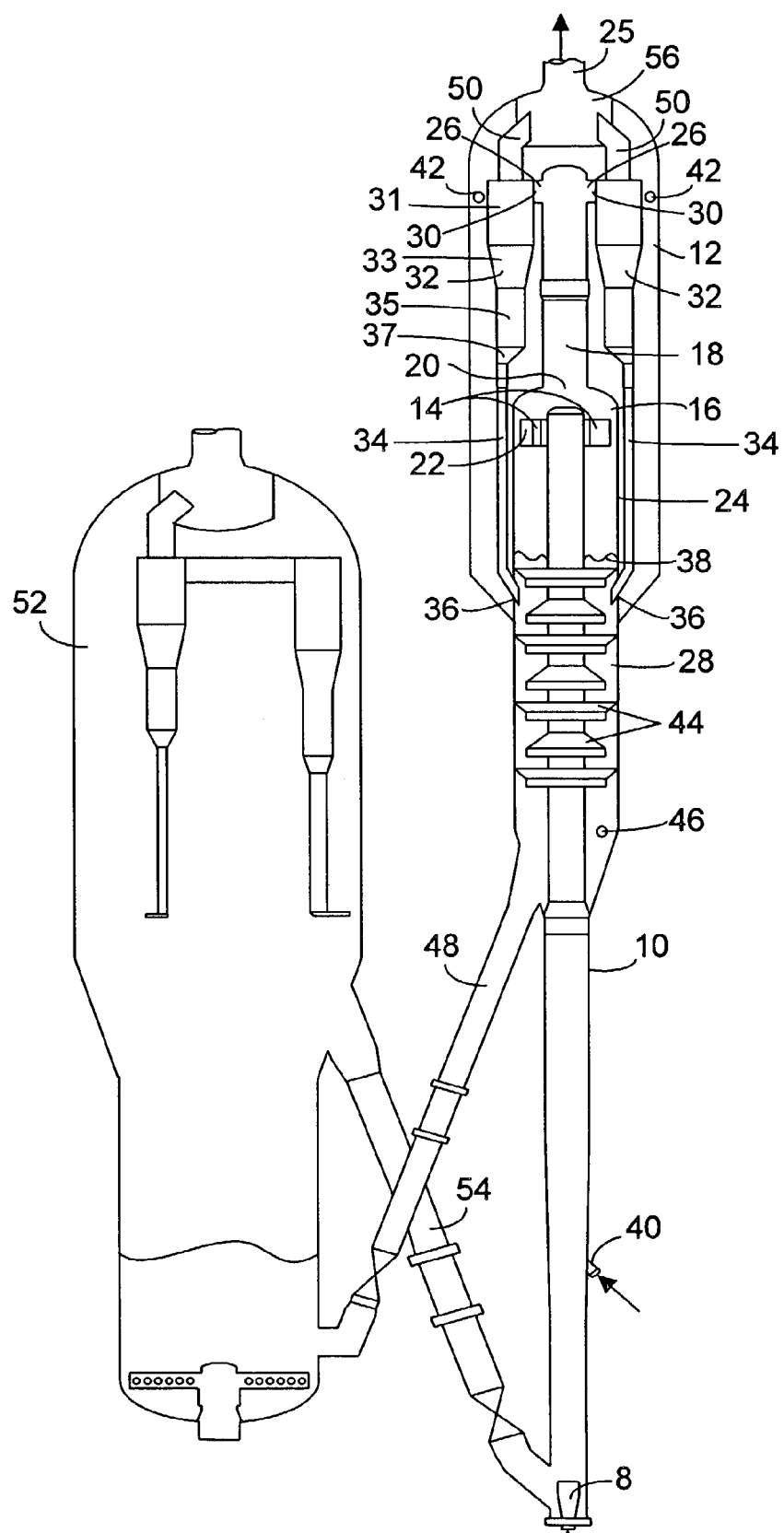
FIG. 1 is a schematic elevational view of an FCC unit arranged in accordance with this invention.

FIG. 1 is the schematic illustration of an FCC unit embodying the present invention. The FCC unit includes an elongated riser or reactor conduit 10. Hot catalyst is delivered to a lower section of the reactor conduit 10 at which a fluidizing gas from a distributor 8 pneumatically conveys the catalyst particles upwardly through the reactor conduit 10. As the mixture of catalyst and conveying gas continues up the reactor conduit contact with hot catalyst vaporizes the hydrocarbons and further conveys the mixture of gas and catalyst through the reactor conduit 10 while cracking the hydrocarbons to desirable lower boiling products.

The reactor conduit 10 extends upwardly into a reactor vessel 12 as in a typical FCC arrangement. The reactor conduit 10 preferably has a vertical orientation within the reactor vessel 12 and may extend upwardly through a bottom of the reactor vessel 12. The reactor vessel 12 includes a disengaging chamber 16 defined by an outer wall 24. The outer wall 24 of the disengaging chamber 16 has sections, some of which may be cylindrical. The reactor conduit 10 terminates in the disengaging chamber 16 at exits defined by the end of swirl arms 14. Each of the swirl arms 14 may be a curved tube that has an axis of curvature that may be parallel to the reactor conduit 10. Each swirl arm 14 has one end communicatively connected to the reactor conduit 10 and another open end comprising a discharge opening 22. The swirl arm 14 discharges a mixture of gaseous fluids comprising cracked products and solid catalyst particles through the discharge opening 22. Tangential discharge of gases and catalyst from the discharge opening 22 produces a swirling helical motion about the cylindrical interior of the disengaging chamber 16. Centripetal acceleration associated with the helical motion forces the heavier catalyst particles to the outer portions of the disengaging chamber 16. Catalyst particles from the discharge openings 22 collect in the bottom of the disengaging chamber 16 to form a dense catalyst bed 38. The gases, having a lower density than the solid catalyst particles, more easily change direction and begin an upward spiral. The disengaging chamber 16 includes a gas recovery conduit 18 with an inlet 20 through which the spiraling gases ultimately travel. The gases that enter the gas recovery conduit 18 through the inlet 20 will usually contain a light loading of catalyst particles. The inlet 20 recovers gases from the discharge openings 22 as well as stripping gases from a stripping section 28 which may be located in the disengaging chamber 16 as is hereinafter described. The loading of catalyst particles in the gases entering the gas recovery conduit 18 are usually less than 16 kg/m$^3$ (1 lb/ft$^3$) and typically less than 3 kg/m$^3$ (0.2 lb/ft$^3$). The gas recovery conduit 18 of the disengaging chamber 16 includes an exit or outlet 26 contiguous with an inlet or entrance 30 to one or more cyclones 32 that effect a further removal of catalyst particulate material from the gases exiting the gas recovery conduit 18 of the disengaging chamber 16. The disengaging chamber 16, the gas recovery conduit 18 thereof and the cyclones 32 are all directly connected, meaning that they are in fluid communication with each other and sealed against substantial leakage. Hence, substantially all of the gases and solids exiting the disengaging chamber 16 enter the cyclones 32.

The cyclones 32 create a swirl motion therein to establish a vortex that separates solids from gases. A product gas stream, relatively free of catalyst particles, exits the cyclones 32 through vapor outlet pipes 50 into a fluid-sealed plenum chamber 56. The product stream then exits the reactor vessel 12 through an outlet 25. Each cyclone 32 includes an upper cylindrical barrel section 31 contiguous with the entrance 30. The barrel section 31 is connected by a first frustoconical section 33 to a hopper section 35. The hopper section 35 is contiguous with a second frustoconical section 37 which is contiguous with a dipleg 34. Catalyst solids recovered by the cyclones 32 exit the bottom of the cyclone through diplegs 34. The diplegs 34 comprise conduits that may have one or more sections. The diplegs 34 extend downwardly in the reactor vessel 12 and extend through an opening 36 in the outer wall 24 of the disengaging chamber 16. The dipleg 34 is thus directly connected to the disengaging chamber 16, meaning that the dipleg 34 is sealed against leakage such that substantially all of the solids and gases exiting the dipleg 34 enter into the disengaging chamber 16. The dipleg 34 shown in FIG. 1 includes a diagonal section that extends into the disengaging chamber 16. However, other configurations of the dipleg 34 are embraced by the invention, and it is not necessary that the dipleg 34 extend beyond the outer wall 24 of the disengaging chamber 16. Suitable devices, such as a slip joint or an expansion joint, may be used at the opening 36 to accommodate differential thermal expansion between the dipleg 34 and the opening 36 in the outer wall 24 of the disengaging chamber 16. Moreover, a suitable valve, such as a trickle valve, may be used on the outlet of the dipleg 34 to regulate catalyst flow. If a slip joint is used between the dip leg 34 and the opening 36, an inert gas, such a steam, may be injected into the reactor vessel 12 by a distributor 42 to purge the reactor and prevent gases or solids from escaping the slip joint. If an expansion joint is used at opening 36, no purge will be necessary to prevent gases or solids from escaping through the opening 36 by the expansion joint. However, injection of an inert gas may be necessary to purge other gaps between piping in the reactor vessel 12.

The dipleg 34 delivers catalyst to the dense catalyst bed 38 in the disengaging chamber 16. Catalyst solids in the dense catalyst bed 38 enter the stripping section 28 which may be located in the disengaging chamber 16. Catalyst solids pass downwardly through and/or over a series of baffles 44 in the stripping section 28. A stripping fluid, typically steam, enters a lower portion of the stripping section 28 through at least one distributor 46. Countercurrent contact of the catalyst with the stripping fluid over the baffles 44 displaces product gases adsorbed on the catalyst as it continues downwardly through the stripping section 28. Stripped catalyst from the stripping section 28 may pass through a conduit 48 to a catalyst regenerator 52. In the regenerator, coke deposits are combusted from the surface of the catalyst by contact with an oxygen-containing gas at high temperature. Following regeneration, regenerated catalyst particles are delivered back to the bottom of the reactor conduit 10 through a conduit 54.

Figure 3:
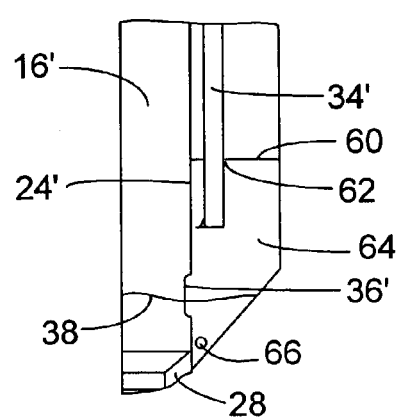
FIG. 3 is an enlarged section of FIG. 2.
Figure 2:
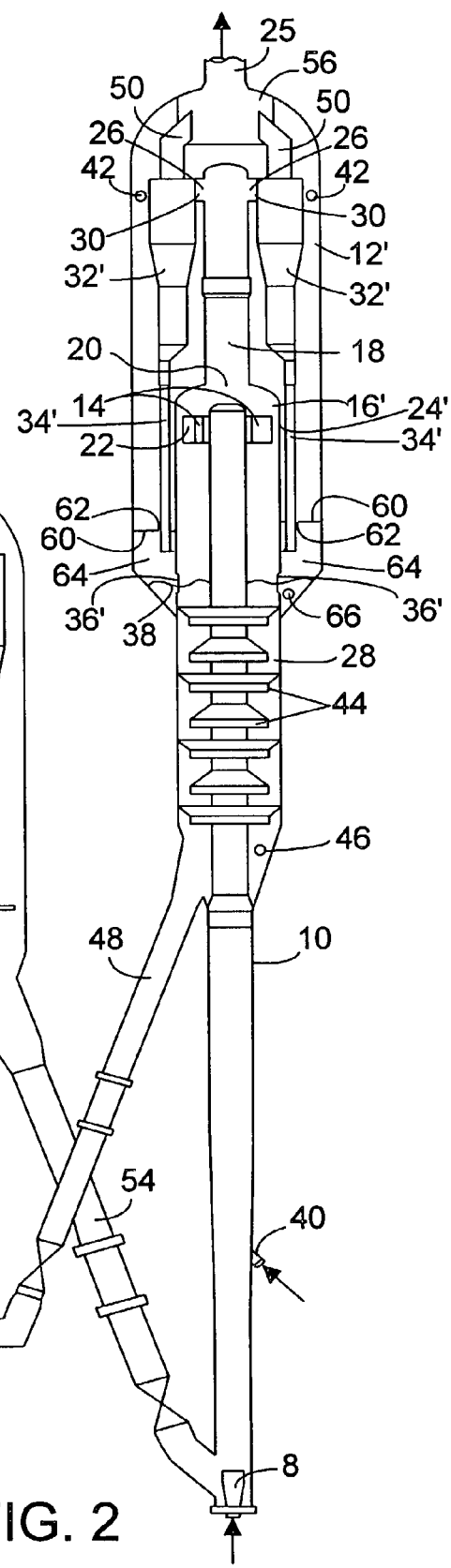
FIG. 2 is a schematic elevational view of an alternative FCC unit arranged in accordance with this invention.

FIG. 2 shows an alternative embodiment of the present invention shown in FIG. 1. FIG. 3 shows an enlarged section of FIG. 2. In FIGS. 2 and 3, the same reference numerals will be used to designate the same elements as in FIG. 1. However, elements having a different configuration in FIG. 2 than in FIG. 1 will be designated with the same reference numeral as in FIG. 1 but marked with a prime symbol ('). Referring to FIG. 2, the diplegs 34' of the cyclones 32' do not extend all the way to the openings 36' in the outer wall 24' of the disengaging chamber 16'. However, the diplegs 34' extend at least to and in an embodiment through an opening 62 in an intermediate wall 60 in the reactor vessel 12'. The intermediate wall 60 defines an intermediate chamber 64 with the wall of the reactor vessel 12' and the outer wall 24' of the disengaging chamber 16'. FIG. 3 shows this arrangement in detail. The intermediate wall 60 may be secured to the inner surface of the outer wall of the reactor vessel 12' and to the outer surface of the outer wall 24'. An expansion joint may be provided between the opening 62 in the intermediate wall 60 and the dipleg 34'. This arrangement would obviate the need for a purge to prevent escape of gases from intermediate chamber 64 into the open volume in the reactor vessel 12'. If a slip joint is provided between the opening 62 in the intermediate wall 60 and the dipleg 34', an inert gas purge will be necessary to prevent gases from escaping the intermediate chamber 64 through opening 62. The intermediate wall 60 may be made less robust than the outer wall 24' or the wall of the reactor vessel 12'. If a pressure differential becomes severe, the intermediate wall 60 will fail or blow out before the outer wall 24' of the disengaging chamber 16' or the wall of the reactor vessel 12' fails, thus preventing pervasive damage to the disengaging chamber 16' or the reactor vessel 12'. However, the intermediate wall 60 is shown in FIGS. 2 and 3 to be secured such as by welding only to the outer surface of the outer wall 24' of the disengaging chamber 16'. Alternatively, the intermediate wall 60 may be secured only to the dipleg 34' about the opening 62 or only to the inner surface of the outer wall of the reactor vessel 12'. In these cases, purge of inert gas from distributor 42 will be necessary to prevent gases from intermediate chamber 64 from escaping. In the event of a shutdown or malfunction which may precipitate a substantial pressure differential between the disengaging chamber 16' and the reactor vessel 12', the intermediate wall 60 can bend about its securement to permit equalization of the pressure differential. The intermediate wall 60 should have a small thickness compared to the outer wall 24' of the disengaging chamber 16' and/or the wall of the reactor vessel 12' to facilitate bending or blow out to relieve pressure. In an embodiment, the intermediate wall 60 should be less than ⅛ of the thickness of the outer wall 24' or the wall of the reactor vessel 12'. Edges of the intermediate wall 60 which are not secured to an adjacent surface define a gap therewith which is minimal and less than 25% of the radius of the reactor vessel 12'. The gap between the edges of the intermediate wall 60 and other walls to which it is not secured should only be large enough to permit thermal expansion so as to reduce the load necessary to pump steam into the reactor vessel 12' and prevent the escape of product gases therefrom. Consequently, purge stream from the distributor 42 purges through such gaps to prevent vapors in an intermediate chamber 64 from escaping to the remainder of the reactor vessel 12'. In an embodiment, the vapors in the intermediate chamber 64 may only escape through the openings 36' in the outer wall 24' of the disengaging chamber 16'. The openings 36' allow this dense catalyst bed 38 to form both within and without of the outer wall 24' of the disengaging chamber 16'. A distributor 66 may distribute fluidizing gas, such as steam, into the intermediate chamber 64 to facilitate entry of the catalyst solids into the disengaging chamber 16' through the openings 36'. If the level of the dense catalyst bed 38 is designed to be higher than the openings 36', additional vent openings (not shown) may be made in the outer wall 24' of the disengaging chamber 16' to permit vapors from the intermediate chamber 64 to enter into the disengaging chamber 16'. Under such a design, the inert gas distributor 66 becomes more necessary. Such vapors from the intermediate chamber 64 that enter the disengaging chamber 16' will mix with stripping gas from the stripping section 28 rising through the disengaging chamber 16' and vaporous product and entrained catalyst from the discharge openings 22 will ascend through the gas recovery conduit 18 of the disengaging chamber 16' through the cyclones 32' and out the vapor outlet pipes 50 and the outlet 25. However, product gas from the intermediate chamber 64 will not be allowed to mix in the reactor vessel 12', thereby reducing the residence time of gaseous product discharged from the discharge openings 22 from the reactor conduit 10. The diplegs 34' in FIGS. 2 and 3 are shown with counter-weighted flapper valves because the bottom edge of the dipleg 34' is generally horizontal. Other configurations of the outlet of the dipleg may be applicable, such as vertical or angled outlets. In those cases, trickle valves or angled flapper valves may be appropriate, respectively. Additionally, a vent (not shown) may be provided in the disengaging chamber 16' or in the gas recovery conduit 18 thereof to equalize pressure between the disengaging chamber 16' and the reactor vessel 12' and/or the intermediate chamber 64 in the event of a malfunction. The vent may comprise a piping arrangement with one end at a lower elevation in the reactor vessel 12' or in the intermediate chamber 60 and another end in communication with the gas recovery conduit 18. Such an arrangement may be useful if a side stripper is employed.

Figure 4:
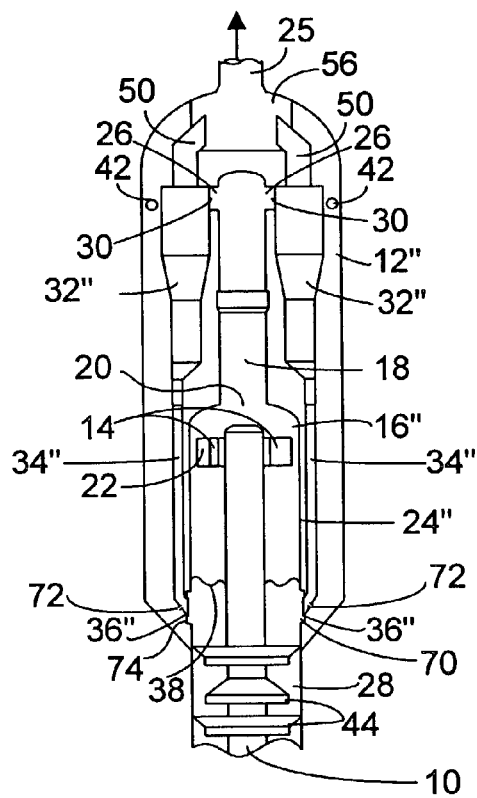
FIG. 4 is a schematic elevational view of an alternative partial FCC unit arranged in accordance with this invention.

FIG. 4 is a further alternate embodiment of the invention shown in FIG. 1. Elements in FIG. 4 that have different configurations than the corresponding elements in FIGS. 1–3 will be designated with a reference numeral marked with a double prime symbol ("). The outer wall 24" of the disengaging chamber 16" is expanded around the openings 36" to define an extended section 70. In an embodiment, the diplegs 34" of the cyclones 32" include a diagonal section and extend to the opening 36" to deliver gases and solids to the dense catalyst bed 38 in the disengaging chamber 16". The extended section 70, in an embodiment, comprises a cylindrical band which has a diameter which is greater than the diameter of the disengaging chamber 16". Vents 72 in the dipleg 34" serve to vent purge gas from the distributor 42 through the dipleg 34", the opening 36" and into the disengaging chamber 16". The embodiment in FIG. 4 contemplates sealing the circumference of the dipleg 34" to the outer wall 24" of the disengaging chamber 16". Hence, the dipleg 34" is equipped with the vents 72 to purge the outlet of the dipleg and to allow for pressure relief in the event of unit malfunction. In this embodiment, the diplegs 34" can be equipped with slip joints to allow for differential thermal expansion but these are not shown in FIG. 4. Purge gas will also flow through slip joints to prevent product gas from escaping into the reactor vessel 12". Alternatively, the diplegs 34" may be completely sealed against fluid communication with the reactor vessel 12" but allow for thermal expansion, as is known in the art by use of an expansion joint. Under this alternative, the distributor 42 and the vents 72 would be omitted. Moreover, the diplegs 34" are equipped with a trickle valve, which may be omitted or another type of outlet valve for the dipleg may be used. The cylindrical extended section 70 is defined by an outer cylindrical wall 74 and top and bottoms walls which connect the expanded cylindrical wall 74 to the outer wall 24" of the disengaging chamber 16".

Figure 5:
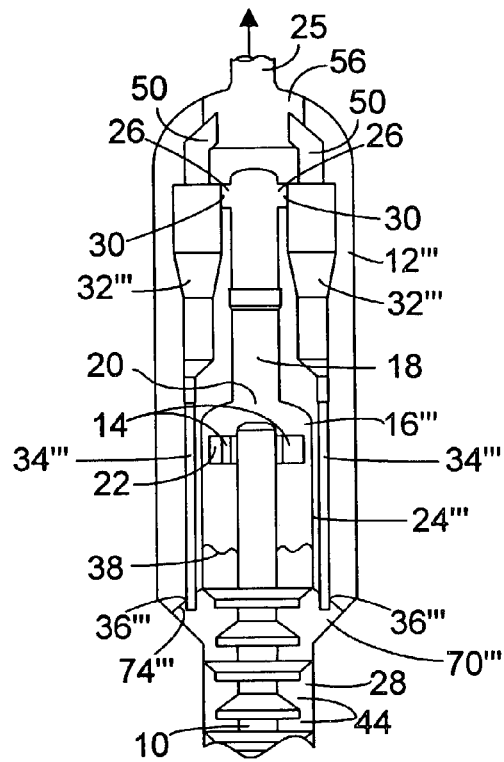
FIG. 5 is a schematic elevational view of an alternative partial FCC unit arranged in accordance with this invention.

FIG. 5 is an alternative embodiment to the expanded disengaging chamber. Reference numerals in FIG. 5 which refer to elements which have a different configuration than in any of the FIGS. 1–4 are marked with a triple prime symbol ('''). In the embodiment in FIG. 5, the disengaging chamber 16''' is expanded to divide the extended section 70''' which circumferences the disengaging chamber 16'''. In an embodiment, the annular wall 74''' extends diagonally from the outer wall 24''' of the disengaging chamber 16''' to join the shell of the reactor vessel 12''', thereby defining the extended section 70'''. The diplegs 34''' of the cyclones 32''' extend through the openings 36''' in the extended wall 74''' of the outer wall 24''' of the disengaging chamber 16'''. Consequently, the diplegs 34''' omit the diagonal section. In an embodiment, the dipleg is sealed to the expanded wall 74''' with an expansion joint, so that no vapors from outside the extended section 70''' come in or come out through the wall 74''' except through the dipleg 34'''. Under such conditions, the purge gas from a distributor may be omitted. Alternatively, in another embodiment, the distributor of purge gas may be retained, although not shown in FIG. 5, and either the dipleg 34''' is coupled by a slip joint to the wall 74''' or a vent opening is provided somewhere in the outer wall 24''' of the disengaging chamber 16''' or in the gas recovery conduit 18 to allow purge gas therethrough. The dipleg 34''' is shown without any outlet valve and extending through the expanded wall 74'''. However, appropriate outlet valves may be provided and the dipleg 34''' may be designed to extend not more than to the expanded wall 74'''.

Figure 7:
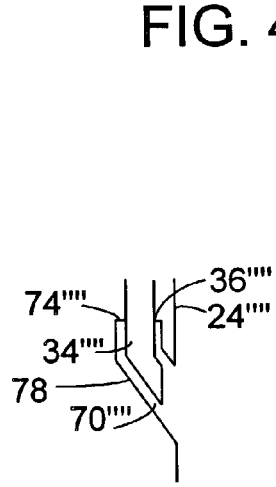
FIG. 7 is an enlarged view of a section of FIG. 6.
Figure 6:
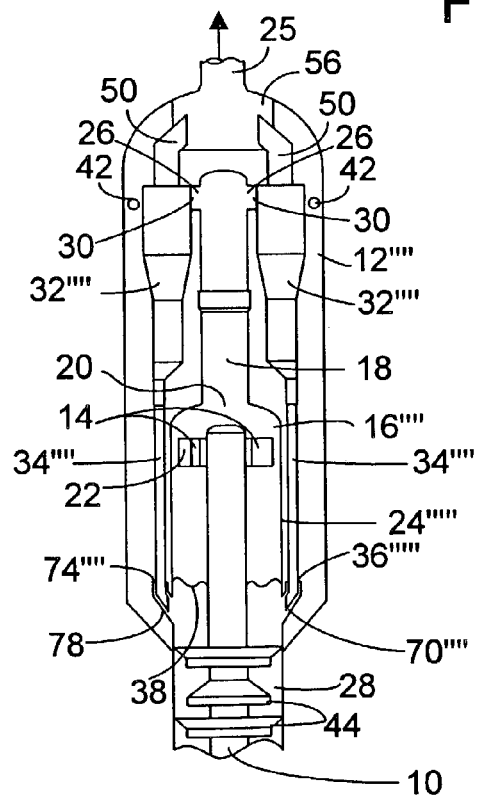
FIG. 6 is a schematic elevational view of an alternative partial FCC unit arranged in accordance with this invention.

FIG. 6 shows a further embodiment of the present invention. FIG. 7 shows a partial expanded view of a portion of FIG. 6. In FIGS. 6 and 7, reference numerals which designate elements that have different configurations from corresponding elements in FIGS. 1–5 are marked with a quadruple prime (''''). In this embodiment, the disengaging chamber 16'''' is equipped with reception tubes 78 extending from the outer wall 24'''' of the disengaging chamber 16''''. The diplegs 34'''' of the cyclones 32'''' extend through the opening 36'''' in a wall 74'''' of the reception tubes 78. The reception tubes 78 together define the extended section 70'''' which receive the lower section of the diplegs 34''''. A slip joint is provided in the opening 36'''' to allow differential thermal expansion between the dipleg 34'''' and the wall 74'''' of the reception tubes 78. Hence, purge gas from the distributor 42 in the reactor vessel 12'''' may purge through a gap (not shown) between the inner diameter of the opening 36'''' in the wall 74'''' and the outer diameter of the dipleg 34''''. The flow rate of purge gas from the distributor 42 is set so that purge gas can only go through the opening 36'''' into the extended section 70'''' but gases and entrained catalyst within the extended section 70'''' cannot exit therefrom through the opening 36''''. Alternatively, the dipleg 34'''' may connected by an expansion joint to the reception tubes 78 obviating the need for inert gas purge. In a further alternative, the extended section 70'''' may comprise a unitary annular section comprising a plurality of the openings 36'''' which circumferences all or a portion of the disengaging chamber 16''''.

What is claimed is:

1. An apparatus for separating solid particles from a stream comprising a mixture of gaseous hydrocarbons and solid catalyst particles, said apparatus comprising:

an elongated reactor conduit in which hydrocarbon feed is contacted with catalyst particles to produce a gaseous product, said reactor conduit including an outlet;

a disengaging chamber containing said outlet of said reactor conduit, an exit of said disengaging chamber being contiguous with an entrance to a cyclone separator; and a reactor vessel containing said cyclone separator having a gaseous product outlet and a catalyst dipleg; said dipleg extending to an opening in a wall that separates a volume in the reactor vessel from a volume in said disengaging chamber, said wall having a smaller thickness than a wall of said disengaging chamber.

2. The apparatus of claim 1 wherein the dipleg extends to said disengaging chamber.

3. The apparatus of claim 1 including a distributor in said reactor vessel for distributing a purge gas into said reactor vessel.

4. The apparatus of claim 1 wherein the dipleg extends to an intermediate chamber between said wall and disengaging chamber, and a passage is provided between said intermediate chamber and said disengaging chamber.

5. The apparatus of claim 1 wherein said disengaging chamber includes a stripping section.

6. The apparatus of claim 1 wherein said disengaging chamber includes a recovery conduit that is contiguous with an inlet conduit to said cyclone separator.

7. The apparatus of claim 1 wherein said dipleg comprises a plurality of sections.

8. The apparatus of claim 1 wherein said outlet of said reactor conduit is at the end of a swirl tube.

9. An apparatus for separating solid particles from a stream comprising a mixture of gaseous fluids and solid particles, said apparatus comprising:
   an elongated reactor conduit in which hydrocarbon feed is contacted with solid particles to produce a gaseous product, said reactor conduit including an outlet;
   a disengaging chamber containing said outlet of said reactor conduit, an exit of said disengaging chamber being contiguous with an entrance to a separator; and
   a reactor vessel containing said separator having an gaseous product outlet and a solids conduit, said solids conduit having at least one section extending from separator to an opening in a wall of said disengaging chamber.

10. The apparatus of claim 9 including a distributor in said reactor vessel for distributing a purge gas into said reactor vessel.

11. The apparatus of claim 9 wherein said disengaging chamber includes a stripping section.

12. The apparatus of claim 9 wherein said disengaging chamber includes a recovery conduit that is contiguous with an inlet conduit to said separator.

13. The apparatus of claim 9 wherein said solids conduit is a dipleg that comprises a plurality of sections.

14. A process for contacting hydrocarbon feed with solid catalyst particles and separating said solid catalyst particles from a product stream comprising a mixture of gaseous hydrocarbons and solid catalyst particles, said process comprising:
   contacting hydrocarbon feed with solid catalyst particles in a reaction conduit;
   urging gaseous hydrocarbon product and solid catalyst particles from said reaction conduit into a disengaging chamber;
   disengaging gaseous hydrocarbon product from solid catalyst particles in said disengaging chamber;
   passing substantially all of said gaseous hydrocarbon product disengaged from said solid catalyst particles to a separator;
   further separating gaseous hydrocarbon product from said solid catalyst particles in said separator;
   delivering said solid catalyst particles through an opening in a wall that separates a volume in the reactor vessel from a volume in said disengaging chamber; and
   preventing said solid catalyst particles from becoming entrained in said volume in the reactor vessel.

15. The process of claim 14 wherein said solid catalyst particles are delivered from said separator directly to said disengaging chamber.

16. The process of claim 14 wherein said solid catalyst particles are delivered from said separator to an intermediate chamber and gaseous product and solid catalyst particles pass between said intermediate chamber and said disengaging chamber.

17. The process of claim 14 further including stripping solid catalyst particles in said disengaging chamber.

18. The process of claim 14 further including purging said reactor vessel of gases through an opening in said disengaging chamber.

* * * * *